(12) United States Patent
Behdasht et al.

(10) Patent No.: US 9,152,258 B2
(45) Date of Patent: Oct. 6, 2015

(54) USER INTERFACE FOR A TOUCH SCREEN

(71) Applicant: Neonode Inc., Santa Clara, CA (US)

(72) Inventors: Remo Behdasht, New South Wales (AU); Carl Richard Henriksson, Stockholm (SE); Thomas Eriksson, Stocksund (SE); Joseph Shain, Rehovot (IL); Anders Jansson, Älta (SE); Niklas Kvist, Varmdo (SE); Robert Pettersson, Hägersten (SE); Lars Sparf, Vällingby (SE); John Karlsson, Märsta (SE)

(73) Assignee: Neonode Inc., San Jose, CA (US)

( * ) Notice: Subject to any disclaimer, the term of this patent is extended or adjusted under 35 U.S.C. 154(b) by 0 days.

(21) Appl. No.: 13/745,819

(22) Filed: Jan. 20, 2013

(65) Prior Publication Data

US 2013/0127765 A1    May 23, 2013

Related U.S. Application Data

(63) Continuation-in-part of application No. 13/053,254, filed on Mar. 22, 2011, now Pat. No. 8,896,575, and a continuation-in-part of application No. 12/486,033, filed on Jun. 17, 2009, said application No. 13/053,254 is a continuation of application No. 13/052,511, filed on Mar. 21, 2011, and a continuation-in-part of application No. 12/371,609, filed on Feb. 15, 2009, now Pat. No. 8,339,379, and a continuation-in-part of application No. 12/760,567, filed on Apr. 15, 2010, and a continuation-in-part of application No. 12/760,568, filed on Apr. 15, 2010.

(60) Provisional application No. 61/591,921, filed on Jan. 29, 2012, provisional application No. 61/379,012, filed on Sep. 1, 2010, provisional application No. 61/380,600, filed on Sep. 7, 2010, provisional application No. 61/410,930, filed on Nov. 7, 2010, provisional application No. 61/169,779, filed on Apr. 16, 2009, provisional application No. 61/132,469, filed on Jun. 19, 2008.

(51) Int. Cl.
| | |
|---|---|
| *G06F 3/041* | (2006.01) |
| *G06F 3/042* | (2006.01) |
| *G06F 3/0485* | (2013.01) |
| *G06F 3/0488* | (2013.01) |

(52) U.S. Cl.
CPC ............... *G06F 3/041* (2013.01); *G06F 3/042* (2013.01); *G06F 3/0414* (2013.01); *G06F 3/0416* (2013.01); *G06F 3/0421* (2013.01); *G06F 3/0425* (2013.01); *G06F 3/0428* (2013.01); *G06F 3/0485* (2013.01); *G06F 3/04883* (2013.01); *G06F 2203/04806* (2013.01)

(58) Field of Classification Search
CPC ...... G06F 3/041; G06F 3/0421; G06F 3/0428
USPC ........................ 345/173, 175, 179; 178/18.09
See application file for complete search history.

(56) References Cited

U.S. PATENT DOCUMENTS

| | | |
|---|---|---|
| 5,757,368 A | 5/1998 | Gerpheide et al. |
| 5,889,236 A | 3/1999 | Gillespie et al. |

(Continued)

*Primary Examiner* — Allison Johnson
*Assistant Examiner* — Afroza Chowdhury
(74) *Attorney, Agent, or Firm* — Soquel Group LLC

(57) ABSTRACT

A non-transitory computer readable medium storing instructions which, when executed by a processor of an electronic device that includes a touch sensitive and pressure sensitive display, cause the processor to enable a user interface of the electronic device, by which a glide gesture along the display and an amount of pressure applied to the display both generate the same user interface command.

8 Claims, 10 Drawing Sheets

(56) References Cited

U.S. PATENT DOCUMENTS

| | | | |
|---|---|---|---|
| 5,943,044 A | 8/1999 | Martinelli et al. | |
| 5,949,557 A * | 9/1999 | Powell | 359/8 |
| 6,340,979 B1 | 1/2002 | Beaton et al. | |
| 6,512,838 B1 * | 1/2003 | Rafii et al. | 382/106 |
| 6,614,422 B1 * | 9/2003 | Rafii et al. | 345/168 |
| 6,646,633 B1 | 11/2003 | Nicolas | |
| 6,667,695 B2 * | 12/2003 | Pettersson et al. | 341/5 |
| 6,674,895 B2 * | 1/2004 | Rafii et al. | 382/154 |
| 6,677,932 B1 * | 1/2004 | Westerman | 345/173 |
| 6,690,365 B2 | 2/2004 | Hinckley et al. | |
| 6,690,387 B2 | 2/2004 | Zimmerman et al. | |
| 6,707,449 B2 | 3/2004 | Hinckley et al. | |
| 6,765,559 B2 | 7/2004 | Hayakawa | |
| 7,489,303 B1 * | 2/2009 | Pryor | 345/173 |
| 7,557,935 B2 * | 7/2009 | Baruch | 356/614 |
| 7,681,142 B2 * | 3/2010 | Jarrett et al. | 715/784 |
| 8,022,941 B2 * | 9/2011 | Smoot | 345/175 |
| 8,095,879 B2 * | 1/2012 | Goertz | 715/716 |
| 8,339,379 B2 * | 12/2012 | Goertz et al. | 345/175 |
| 8,643,628 B1 * | 2/2014 | Eriksson et al. | 345/175 |
| 8,650,510 B2 * | 2/2014 | Goertz | 715/863 |
| 2002/0015064 A1 | 2/2002 | Robotham et al. | |
| 2002/0075240 A1 * | 6/2002 | Lieberman et al. | 345/170 |
| 2002/0180763 A1 * | 12/2002 | Kung | 345/660 |
| 2003/0063775 A1 * | 4/2003 | Rafii et al. | 382/106 |
| 2003/0122787 A1 | 7/2003 | Zimmerman et al. | |
| 2004/0046744 A1 * | 3/2004 | Rafii et al. | 345/168 |
| 2005/0275636 A1 * | 12/2005 | Dehlin et al. | 345/173 |
| 2006/0028455 A1 * | 2/2006 | Hinckley et al. | 345/173 |
| 2006/0238517 A1 | 10/2006 | King et al. | |
| 2007/0002018 A1 * | 1/2007 | Mori | 345/158 |
| 2007/0051591 A1 | 3/2007 | Otsuka et al. | |
| 2008/0042984 A1 | 2/2008 | Lim et al. | |
| 2008/0136790 A1 | 6/2008 | Hio | |
| 2008/0168404 A1 * | 7/2008 | Ording | 715/863 |
| 2008/0211779 A1 * | 9/2008 | Pryor | 345/173 |
| 2008/0222559 A1 * | 9/2008 | Kim | 715/785 |
| 2008/0235583 A1 * | 9/2008 | Ostergaard et al. | 715/716 |
| 2009/0046140 A1 * | 2/2009 | Lashmet et al. | 348/51 |
| 2009/0140985 A1 * | 6/2009 | Liu | 345/168 |
| 2010/0017872 A1 * | 1/2010 | Goertz et al. | 726/16 |
| 2010/0058282 A1 * | 3/2010 | Fujimura et al. | 716/21 |
| 2010/0073330 A1 * | 3/2010 | Ericson et al. | 345/179 |
| 2010/0093399 A1 * | 4/2010 | Kim et al. | 455/566 |
| 2010/0125786 A1 * | 5/2010 | Ozawa et al. | 715/702 |
| 2010/0134424 A1 | 6/2010 | Brisebois et al. | |
| 2010/0208029 A1 * | 8/2010 | Marti et al. | 348/14.02 |
| 2010/0225604 A1 | 9/2010 | Homma et al. | |
| 2010/0283747 A1 | 11/2010 | Kukulski | |
| 2010/0321289 A1 | 12/2010 | Kim et al. | |
| 2011/0050592 A1 | 3/2011 | Kim et al. | |
| 2011/0070819 A1 * | 3/2011 | Shimy et al. | 455/3.05 |
| 2011/0072452 A1 * | 3/2011 | Shimy et al. | 725/25 |
| 2011/0074699 A1 * | 3/2011 | Marr et al. | 345/173 |
| 2011/0087963 A1 | 4/2011 | Brisebois et al. | |
| 2011/0128234 A1 * | 6/2011 | Lipman et al. | 345/173 |
| 2011/0163978 A1 * | 7/2011 | Park et al. | 345/173 |
| 2011/0179368 A1 | 7/2011 | King et al. | |
| 2011/0179381 A1 | 7/2011 | King | |
| 2011/0310005 A1 | 12/2011 | Chen et al. | |
| 2012/0068971 A1 | 3/2012 | Pemberton-Piggott | |
| 2012/0081299 A1 | 4/2012 | Xiao et al. | |
| 2012/0094723 A1 * | 4/2012 | Goertz | 455/566 |
| 2012/0098754 A1 * | 4/2012 | Kim | 345/173 |
| 2012/0105358 A1 * | 5/2012 | Momeyer et al. | 345/174 |
| 2012/0133645 A1 * | 5/2012 | Jung et al. | 345/419 |
| 2012/0139904 A1 * | 6/2012 | Lee et al. | 345/419 |
| 2012/0192094 A1 * | 7/2012 | Goertz | 715/773 |
| 2013/0152014 A1 * | 6/2013 | Rabii et al. | 715/785 |
| 2013/0169546 A1 * | 7/2013 | Thomas et al. | 345/173 |
| 2014/0104160 A1 * | 4/2014 | Eriksson et al. | 345/156 |

* cited by examiner

USER INTERFACE FOR A TOUCH SCREEN

CROSS REFERENCES TO RELATED APPLICATIONS

This application claims priority benefit of U.S. Provisional Patent Application Ser. No. 61/591,921, entitled USER INTERFACE FOR A LIGHT-BASED TOUCH SCREEN, filed on Jan. 29, 2012 by inventors Remo Behdasht, Richard Henriksson, Thomas Eriksson, Joseph Shain, Anders Jansson, Niklas Kvist, Robert Petterson, Lars Sparf and John Karlsson, the contents of which are hereby incorporated herein in their entirety.

This application is a continuation-in-part of U.S. application Ser. No. 13/053,254, entitled PRESSURE-SENSITIVE TOUCH SCREEN, filed on Mar. 22, 2011 by inventors Magnus Goertz, Thomas Eriksson, Joseph Shain, Anders, Jansson, Niklas Kvist, Robert Pettersson, Lars Sparf and John Karlsson, the contents of which are hereby incorporated herein in their entirety.

This application is a continuation-in-part of U.S. application Ser. No. 12/486,033, entitled USER INTERFACE FOR MOBILE COMPUTER UNIT, filed on Jun. 17, 2009 by inventors Magnus Goertz and Joseph Shain, the contents of which are hereby incorporated herein in their entirety.

U.S. application Ser. No. 13/053,254 claims priority benefit of U.S. Provisional Application Ser. No. 61/379,012, entitled OPTICAL TOUCH SCREEN SYSTEMS USING REFLECTED LIGHT, filed on Sep. 1, 2010 by inventors Magnus Goertz, Thomas, Eriksson, Joseph Shain, Anders Jansson, Niklas Kvist and Robert Pettersson, the contents of which are hereby incorporated herein in their entirety.

U.S. application Ser. No. 13/053,254 claims priority benefit of U.S. Provisional Application Ser. No. 61/380,600, entitled OPTICAL TOUCH SCREEN SYSTEMS USING REFLECTED LIGHT, filed on Sep. 7, 2010 by inventors Magnus Goertz, Thomas, Eriksson, Joseph Shain, Anders Jansson, Niklas Kvist and Robert Pettersson, the contents of which are hereby incorporated herein in their entirety.

U.S. application Ser. No. 13/053,254 claims priority benefit of U.S. Provisional Application Ser. No. 61/410,930, entitled OPTICAL TOUCH SCREEN SYSTEMS USING REFLECTED LIGHT, filed on Nov. 7, 2010 by inventors Magnus Goertz, Thomas, Eriksson, Joseph Shain, Anders Jansson, Niklas Kvist, Robert Pettersson and Lars Sparf, the contents of which are hereby incorporated herein in their entirety.

U.S. application Ser. No. 13/053,254 is a continuation of U.S. application Ser. No. 13/052,511, entitled LIGHT-BASED TOUCH SCREEN WITH SHIFT-ALIGNED EMITTER AND RECIVER LENSES, filed on Mar. 21, 2011 by inventors Magnus Goertz, Thomas, Eriksson, Joseph Shain, Anders Jansson, Niklas Kvist, Robert Pettersson, Lars Sparf and John Karlsson, the contents of which are hereby incorporated herein in their entirety.

U.S. application Ser. No. 13/053,254 is a continuation-in-part of U.S. application Ser. No. 12/371,609, now U.S. Pat. No. 8,339,379, entitled LIGHT-BASED TOUCH SCREEN, filed on Feb. 15, 2009 by inventors Magnus Goertz, Thomas Eriksson and Joseph Shain, the contents of which are hereby incorporated herein in their entirety.

U.S. Ser. No. 13/053,254 is a continuation-in-part of U.S. application Ser. No. 12/760,567, entitled OPTICAL TOUCH SCREEN SYSTEMS USING REFLECTED LIGHT, filed on Apr. 15, 2010 by inventors Magnus Goertz, Thomas Eriksson and Joseph Shain, the contents of which are hereby incorporated herein in their entirety.

U.S. application Ser. No. 13/053,254 is a continuation-in-part of U.S. application Ser. No. 12/760,568, entitled OPTICAL TOUCH SCREEN SYSTEMS USING WIDE LIGHT BEAMS, filed on Apr. 15, 2010 by inventors Magnus Goertz, Thomas Eriksson and Joseph Shain, the contents of which are hereby incorporated herein in their entirety.

U.S. application Ser. No. 12/760,567 claims priority benefit of U.S. Provisional Application Ser. No. 61/169,779, entitled OPTICAL TOUCH SCREEN, filed on Apr. 16, 2009 by inventors Magnus Goertz, Thomas Eriksson and Joseph Shain, the contents of which are hereby incorporated herein in their entirety.

U.S. application Ser. No. 12/486,033 claims priority benefit of U.S. Provisional Application Ser. No. 61/132,469, entitled IMPROVED KEYPAD FOR CHINESE CHARACTERS, filed on Jun. 19, 2008 by inventors Magnus Goertz, Robert Pettersson, Staffan Gustafsson and Johann Gerell, the contents of which are hereby incorporated herein in their entirety.

FIELD OF THE INVENTION

The field of the present invention is pressure-sensitive touch screens.

BACKGROUND OF THE INVENTION

Many consumer electronic devices are now being built with touch sensitive screens, for use with finger or stylus touch user inputs. These devices range from small screen devices such as mobile phones and car entertainment systems, to mid-size screen devices such as notebook computers, to large screen devices such as check-in stations at airports. However, touch screens are generally limited to user input in the form of finger or stylus taps, and sweep gestures. Pressure-sensitive displays that enable detecting an amount of pressure applied to the screen afford additional possibilities for user interfaces.

SUMMARY OF THE DESCRIPTION

Aspects of the present invention relate to user interfaces for touch screens that detect both a touch location and an amount of pressure applied to the screen.

Further aspects of the present invention relate to touch screens that implement these user interfaces and, in one embodiment, to touch screens that implement both a touch sensor and a pressure sensor using an array of light emitters and light receivers.

There is thus provided in accordance with an embodiment of the present invention a light-based touch screen that discriminates between hard touches and soft touches. In one embodiment, a rigidly mounted screen is surrounded by emitters and receivers. A hard touch is discriminated from a soft touch by an increase in detected light at a plurality of receivers, the increase resulting from a bending of the rigidly mounted screen caused by the hard touch. In another embodiment, a screen is flexibly mounted in a housing surrounded by rigidly mounted emitters and receivers. The pressure of the touch lowers the screen into the housing, resulting in an increase in detected light at a plurality of the receivers. Different amounts of pressure correspond to differences in the increased amounts of detected light.

There is additionally provided in accordance with an embodiment of the present invention a touch screen, including a housing, a display mounted in the housing, a touch sensor, mounted in the housing and connected to the display, for identifying an object that is gliding along an upper surface of the display, a pressure sensor, mounted in the housing and connected to the display, for determining that pressure is being applied to the display, and a processor, mounted in the housing and connected to the touch and pressure sensors and to the display, for applying a first scroll command to an image rendered on the display in response to the touch sensor identifying the object gliding along the upper surface of the display, and for applying a second scroll command to the image in response to the pressure sensor determining that pressure is being applied to the display.

There is further provided in accordance with an embodiment of the present invention a non-transitory computer readable medium storing instructions which, when executed by a processor of an electronic device that includes a touch sensitive and pressure sensitive display, cause the processor to enable a user interface of the electronic device, by which a glide gesture along the display and an amount of pressure applied to the display both generate the same user interface command.

There is yet further provided in accordance with an embodiment of the present invention a non-transitory computer readable medium storing instructions which, when executed by a processor of an electronic device that includes a touch sensitive and pressure sensitive display, cause the processor to enable a user interface of the device, by which an image rendered on the display is zoomed in response to pressure being applied to the display, whereby the zoom is performed such that the location within the image at which the pressure is first applied is the center of the zoomed image.

BRIEF DESCRIPTION OF THE DRAWINGS

The present invention will be more fully understood and appreciated from the following detailed description, taken in conjunction with the drawings in which.

Figure 1:
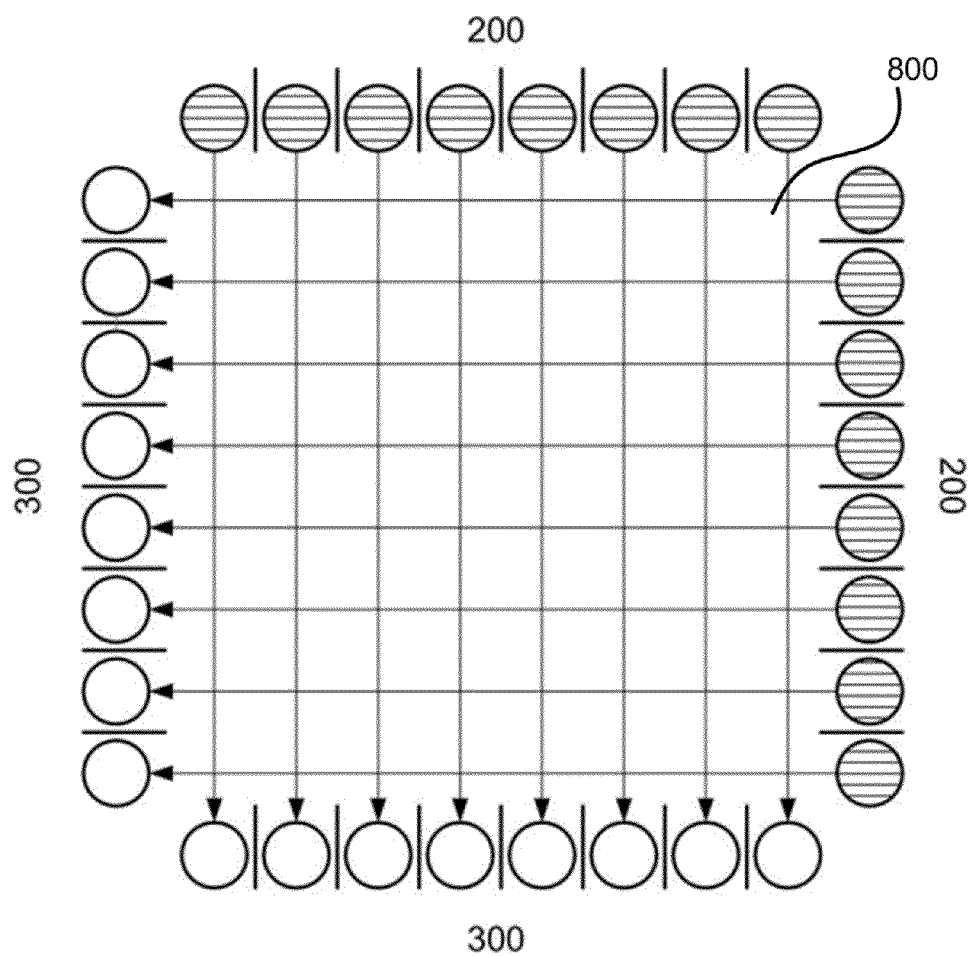
FIG. 1 is a diagram of a touch screen having 16 emitters and 16 receivers, in accordance with an embodiment of the present invention.

In the figures, elements numbered in the 100's generally relate to light beams, elements numbered in the 200's generally relate to light sources, elements numbered in the 300's generally relate to light receivers, elements numbered in the 500's generally relate to light guides, elements numbered in the 700's generally relate to circuit elements, elements numbered in the 800's generally relate to electronic devices, and elements numbered in the 900's generally relate to user interfaces. Elements numbered in the 1000's are operations of flow charts.

Similarly numbered elements represent elements of the same type, but they need not be identical elements.

DETAILED DESCRIPTION

Aspects of the present invention relate to pressure-sensitive touch screens and touch surfaces.

For clarity of exposition, throughout the present specification the term "touch screen" is used as a generic term to refer to touch sensitive surfaces that may or may not include an electronic display. As such, the term "touch screen" as used herein includes inter alia a mouse touchpad as included in many laptop computers, and the cover of a handheld electronic device. The term "optical touch screen" is used as a generic term to refer to light-based touch screens, including inter alia screens that detect a touch based on the difference between an expected light intensity and a detected light intensity, where the detected light intensity may be greater than or less than the expected light intensity. The term "screen glass" is used as a generic term to refer to a transparent screen surface. The screen may be constructed inter alia from glass, or from a non-glass material including inter alia crystal, acrylic and plastic. In some embodiments of the present invention, the screen allows near-infrared light to pass through, but is otherwise non-transparent.

For clarity of exposition, throughout the present specification, the term "emitter" is used as a generic term to refer to a light emitting element, including inter alia a light-emitting diode (LED), and the output end of a fiber optic or tubular light guide that outputs light into a lens or reflector that directs the light over a display surface. The term "receiver" is used as a generic term to refer to a light detecting element, including inter alia a photo diode (PD), and the input end of a fiber optic or tubular light guide that receives light beams that traversed a display surface and directs them to a light detecting element or to an image sensor, the image sensor being inter alia a charge coupled device (CCD) or a complementary metal oxide semiconductor (CMOS) image sensor.

The present invention has multiple embodiments using various touch screen technologies including inter alia resistive, capacitive, projective capacitive and light-based touch sensors. Similarly, many different pressure sensing technologies are used in different embodiments of the present invention. For purposes of exposition, this specification addresses light-based touch sensors and pressure sensors; however, other types of sensors are included within the scope of the invention.

According to embodiments of the present invention, a light-based touch screen includes one or more emitters, including inter alia infra-red or near infra-red light-emitting diodes (LEDs), and a plurality of receivers, including inter alia photo diodes (PDs), arranged along the perimeter surrounding the touch screen or touch surface. The emitters project light substantially parallel to the screen surface, and this light is detected by the receivers. A pointer, such as a finger or a stylus, placed over a portion of the screen blocks some of the light beams, and correspondingly some of the receivers detect less light intensity. The geometry of the locations of the receivers, and the light intensities they detect, suffice to determine screen coordinates of the pointer. The emitters and receivers are controlled for selective activation and de-activation by a controller. Generally, each emitter and receiver has I/O connectors, and signals are transmitted to specify which emitters and which receivers are activated.

In an embodiment of the present invention, plural emitters are arranged along two adjacent sides of a rectangular screen, and plural receivers are arranged along the other two adjacent sides. In this regard, reference is now made to FIG. 1, which is a diagram of a touch screen 800 having 16 emitters 200 and 16 receivers 300, in accordance with an embodiment of the present invention. Emitters 200 emit infra-red or near infra-red light beams across the top of the touch screen, which are detected by corresponding receivers 300 that are directly opposite respective emitters 200. When a pointer touches touch screen 800, it blocks light from reaching some of receivers 300. By identifying, from the receiver outputs, which light beams have been blocked by the pointer, the pointer's location can be determined.

Embodiments of the present invention detect an amount of pressure applied to a touch sensitive surface during a touch operation. Detecting pressure enables discrimination between a light touch and a hard press, and is useful for user interfaces that associate separate actions to a touch and a press. E.g., a user may select a button or icon by touching it, and activate the function associated with the button or icon by pressing on it. Such a user interface is described in applicants' co-pending U.S. application Ser. No. 12/486,033, entitled USER INTERFACE FOR MOBILE COMPUTER UNIT.

Touch sensor and pressure sensor inputs to a central processing unit enable the processing unit to distinguish between no-pressure touch gestures and touch gestures that apply pressure. This allows the processing unit to provide the standard suite of tap and sweep gestures for non-pressure touches, and an additional suite of user inputs when a degree of downward pressure is applied to a screen surface.

In some embodiments of the present invention, a pressure gesture is used to activate a zoom command; namely, a user presses on an image displayed on a screen in order to enlarge the image. The zoom command is generally a smooth zoom, which gradually increases the zoom factor over time, while the screen is being pressed. In one embodiment of the present invention, the pressure sensor distinguishes multiple levels of applied pressure, and the rate at which the zoom factor increases corresponds to the amount of detected pressure, whereby greater pressure corresponds to a faster rate of increase.

Figure 2:
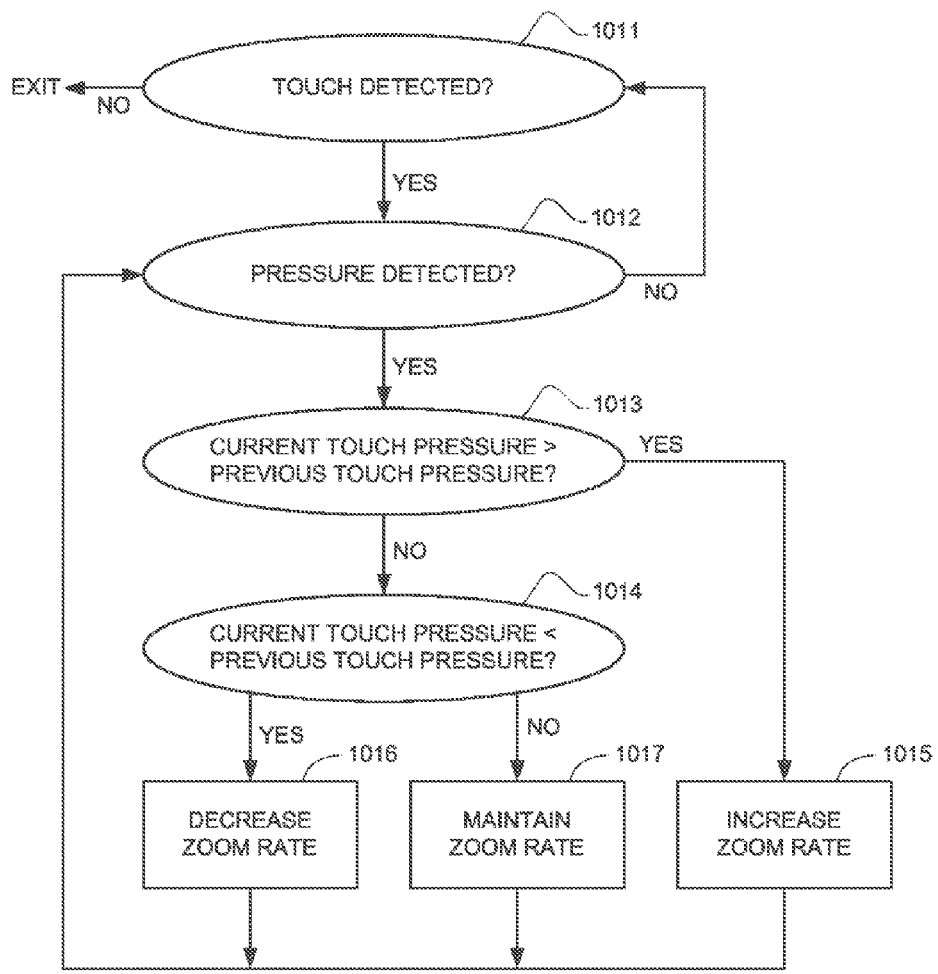
FIG. 2 is a simplified flowchart of a method to activate a zoom function on a pressure-sensitive touch screen, in accordance with an embodiment of the present invention.

Reference is made to FIG. 2, which is a simplified flowchart of a method to activate a zoom function on a pressure-sensitive touch screen, in accordance with an embodiment of the present invention. At operation 1011 a determination is made whether a touch is detected on the touch screen. If not, the method exits. If so, at operation 1012 a further determination is made whether pressure is being applied to the touch screen. If not, the method returns to operation 1011. If so, then the current level of pressure being applied to the screen is detected, and compared with the level of pressure previously applied to the screen. If it is determined at operation 1013 that the current pressure level is greater than the previous pressure level, then at operation 1015 the rate of zoom is increased and the method returns to operation 1012. Otherwise, if it is determined at operation 1014 that the current pressure level is less than the previous pressure level, then at operation 1016 the rate of zoom is decreased and the method returns to operation 1012. Otherwise, the current pressure and the previous pressure levels are the same, and at operation 1017 the zoom rate is maintained and the method returns to operation 1012.

Conventional zoom commands, such as commands activated by a pinch or spread gesture, zoom in on the center of a displayed image portion. In order to zoom in on a different portion of the image, a user is required to pan the image so as to bring its center to a desired location, and then perform a zoom command.

Figure 3:
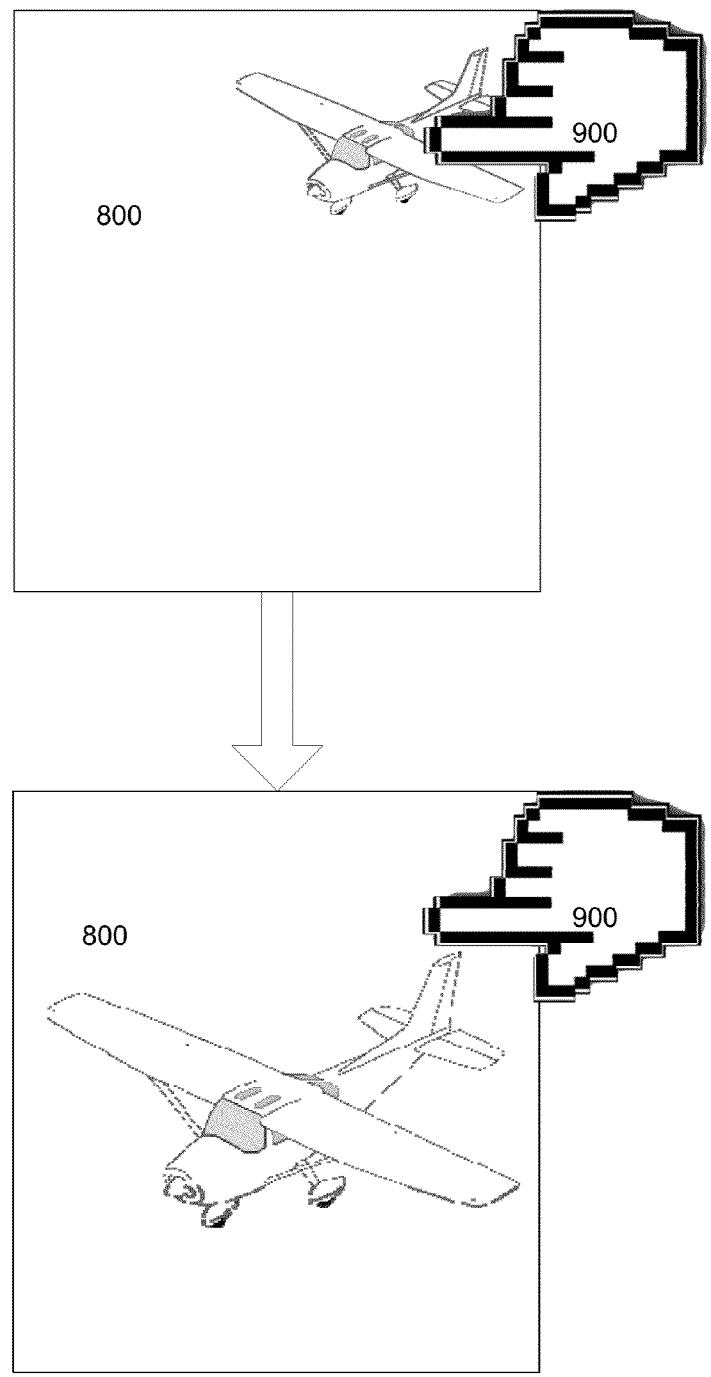
FIG. 3 is a simplified illustration of activation of a zoom function on a pressure-sensitive touch screen, in accordance with an embodiment of the present invention.

In distinction, with embodiments of the present invention, the center of a zoom is the location touched on the display. Reference is made to FIG. 3, which is a simplified illustration of activation of a zoom function on a pressure-sensitive touch screen, in accordance with an embodiment of the present invention. FIG. 3 shows two images of a pressure-sensitive touch screen 800, before and after a zoom operation is performed. In the upper image, showing touch screen 800 before the zoom operation is performed, touch screen 800 displays an airplane in the upper right corner of the screen. A finger 900 is shown applying downward pressure on touch screen 800, at the location of the airplane, to activate a zoom function. Touch screen 800 detects the location of finger 900, and centers the zoomed image at that location. As such, in the lower image, showing touch screen 800 after the zoom operation is performed, the airplane is at the center of touch screen 800. Finger 900 remains at its original location throughout the zoom.

In embodiments of the present invention, the pressure sensor controls parameters of a scroll command. When display of a document or other object extends beyond the limits of touch screen 800, a portion of the document or object is displayed, and the user sweeps a finger along the vertical dimension of the screen in order to scroll the document or object up or down. In one embodiment, the scroll continues even when the user's finger has reached the upper or lower edge of the screen, as long as contact with the screen is maintained. In this embodiment, the speed of scrolling is determined based on the amount of pressure applied by the finger to touch screen 800, whereby a greater pressure on the screen corresponds to a faster scroll rate.

Often it is useful for a user scrolling through a large document or object to change the speed of the scroll dynamically. E.g., a user may wish to scroll quickly in order to move to a desired area within a document, and then continue to scroll slowly within the desired area. In accordance with embodiments of the present invention, the user controls the scrolling speed by adjusting the amount of pressure applied by the finger on touch screen 800. In one embodiment, the user reduces the scrolling speed by applying more pressure on the screen. As such, navigating a document is intuitive; namely, the user begins scrolling by maintaining contact with touch screen 800 after a vertical scroll gesture, and then applies pressure to the screen to reduce scrolling speed. It is often easier for a user to increase pressure than to decrease pressure.

Figure 4:
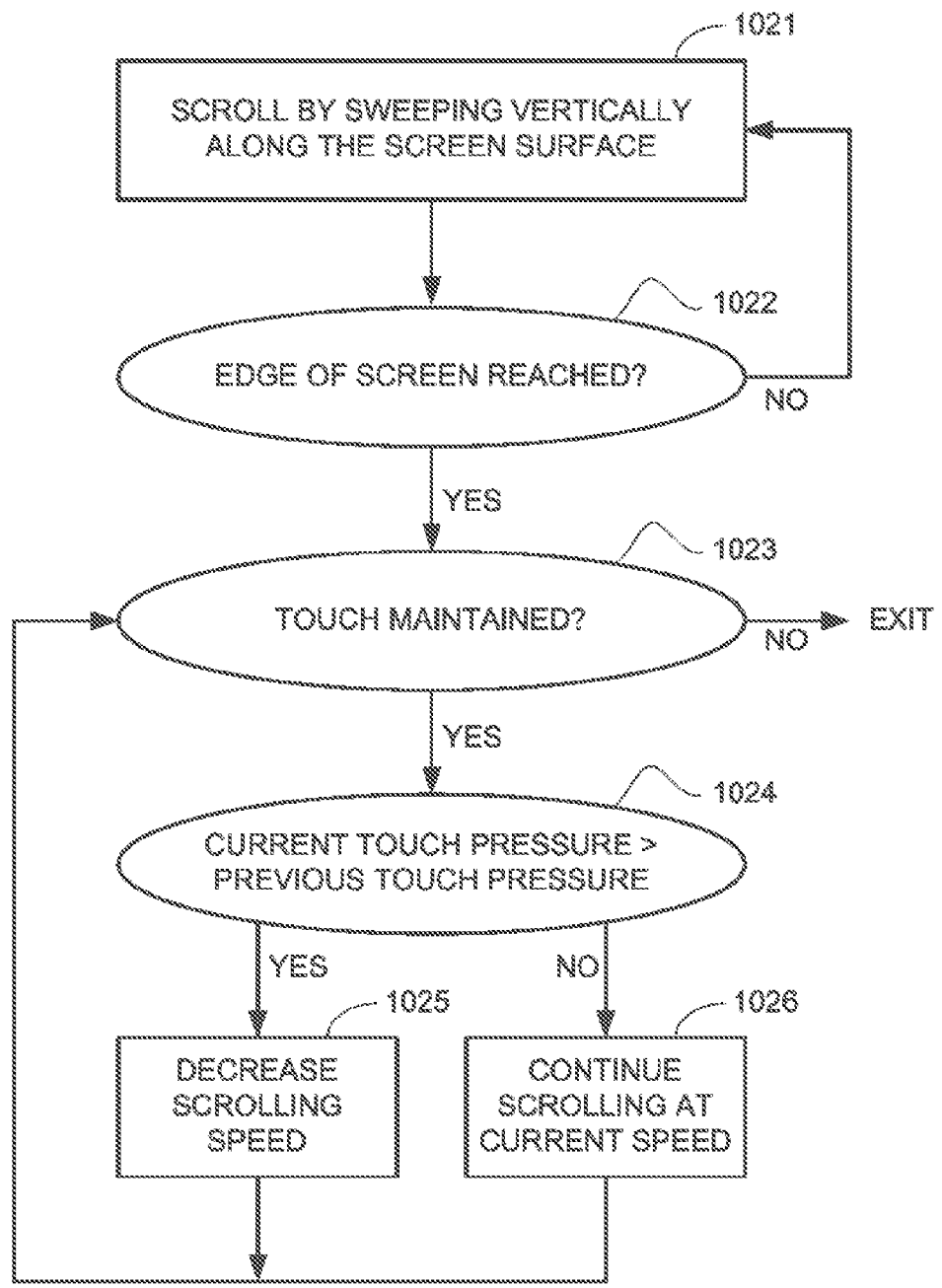
FIG. 4 is simplified flowchart of a method to activate a scroll function on a pressure-sensitive touch screen, in accordance with an embodiment of the present invention.

Reference is made to FIG. 4, which is simplified flowchart of a method to activate a scroll function on a pressure-sensitive touch screen, in accordance with an embodiment of the present invention. At operation 1021 a user scrolls a document or other object by sweeping a finger vertically along the touch screen. At operation 1022 a determination is made whether the finger has reached an edge of the touch screen. If so, then at operation 1023 a further determination is made whether the touch is still maintained. If not, the method exits. Otherwise, the current level of pressure being applied to the screen is detected, and compared with the level of pressure previously applied to the screen. If it is determined at operation 1024 that the current pressure level is greater than the previous pressure level, then at operation 1025 the scrolling speed is decreased and the method returns to operation 1023. Otherwise, at operation 1025 the scrolling speed is maintained, scrolling continues at the same speed, and the method returns to operation 1023.

In some embodiments of the present invention, a touch enabled device includes a base plane, such as a PCB, a light guide frame rigidly mounted on the base plane, and a resilient member attached to the base plane to suspend or "float" a non-rigidly mounted touch screen inside the light guide frame. A press on the touch screen deflects the floating touch screen along a z-axis, exposing more of the light guide frame. A light guide frame reflector, which directs light over the screen as described hereinabove, is formed so that the exposure allows more light to traverse the screen. In this way, when a hard press on the screen occurs, many of the receivers detect a sudden increase in detected light. Moreover, detection of a hard press may be conditioned upon a touch being detected at the same time, thus preventing false detection of a hard press due to a sudden increase in ambient light. When the downward pressure is released, the resilient member returns the screen to its original position within the light guide frame.

Figure 5:
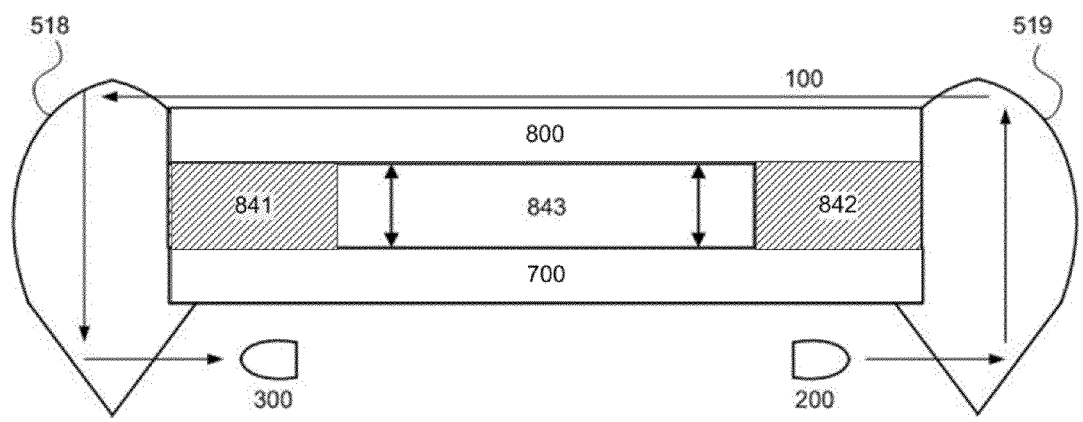
FIGS. 5-8 are illustrations of a touch screen that detects occurrence of a hard press, in accordance with an embodiment of the present invention.

Reference is made to FIGS. 5-8, which are illustrations of a touch screen 800 that detects occurrence of a hard press, in accordance with an embodiment of the present invention. FIG. 5 shows touch screen 800 in rest position, screen 800 being supported by resilient supporting members 841 and 842 which are mounted on a printed circuit board 700 to create a flex air gap 843. FIG. 5 shows two light guides, 518 and 519, one on either side of screen 800, for directing light 100 from an emitter 200 over screen 800 to a receiver 300. Only a small upper portion of each light guide 518 and 519 extends above screen 800. Receiver 300 communicates detected light intensities to a calculating unit 770.

Figure 6:
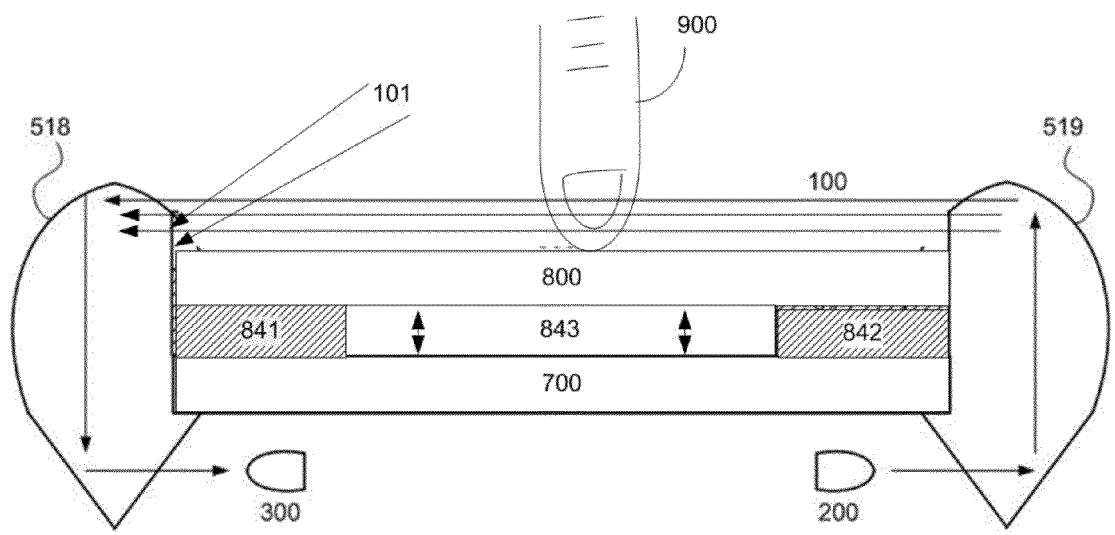

FIG. 6 shows a finger 900 pressing down on the screen, causing members 841 and 842 to compress and to narrow flex air gap 843. As a result, a larger portion of light guides 518 and 519 are exposed above screen 800, thus allowing (a) more light 100 from emitter 200 to traverse screen 800 and be detected by receiver 300, and (b) more ambient light 101 to reach receiver 300. In various embodiments, either or both of these increases in detected light are used to indicate a hard press. In other embodiments, the amount of downward pressure applied is determined based on the amount of additional detected light, thus enabling discrimination between more hard and less hard touches.

Figure 7:
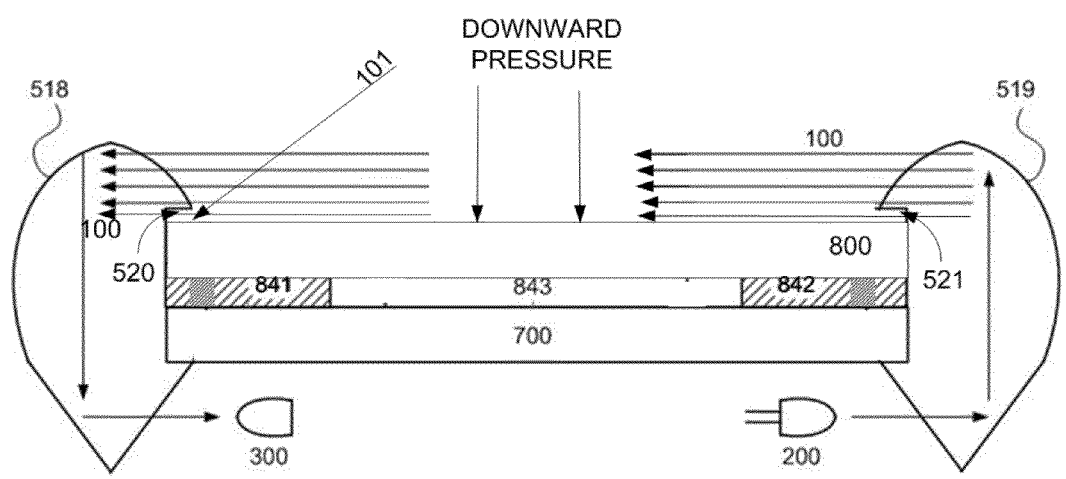
Figure 8:
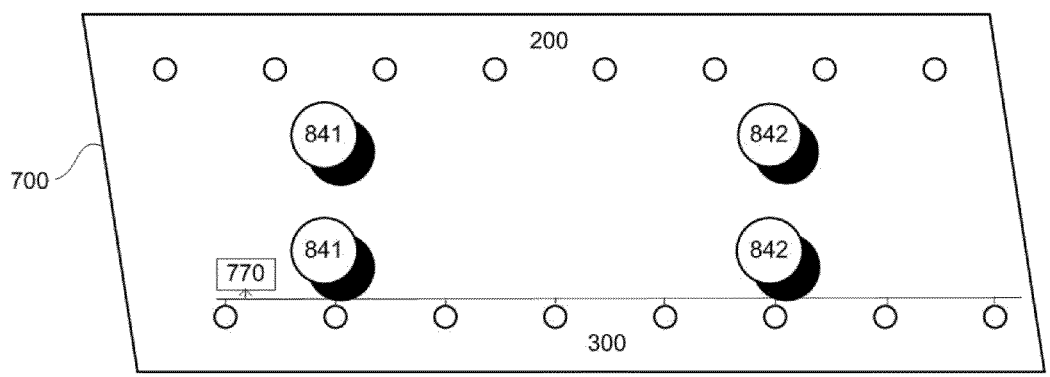

In some embodiments, the light guide frame includes protruding lips 520 and 521, shown in FIG. 7, that extend over the edges of screen 800, to counter balance the upward force of resilient members 841 and 842 when no downward pressure is applied to screen 800. Resilient members 841 and 842 may comprise inter alia a flexible mounting material, a torsion spring, an elastic polymer body, or a hydraulic suspension system. FIG. 8 shows emitters 200, receivers 300 coupled with calculating unit 770, and resilient members 841 and 842 arranged on a single PCB 700.

In other embodiments, the touch screen is not displaceable relative to the frame. However, the screen flexes or bends somewhat in response to a hard press. The bending of the screen causes a sudden increase in detected light in many of the receivers, indicating a hard press on the screen. As indicated hereinabove, detection of a hard press may be conditioned upon a touch also being detected at the same time, thus preventing false detection of a hard press in response to trauma to the device.

Figure 9:
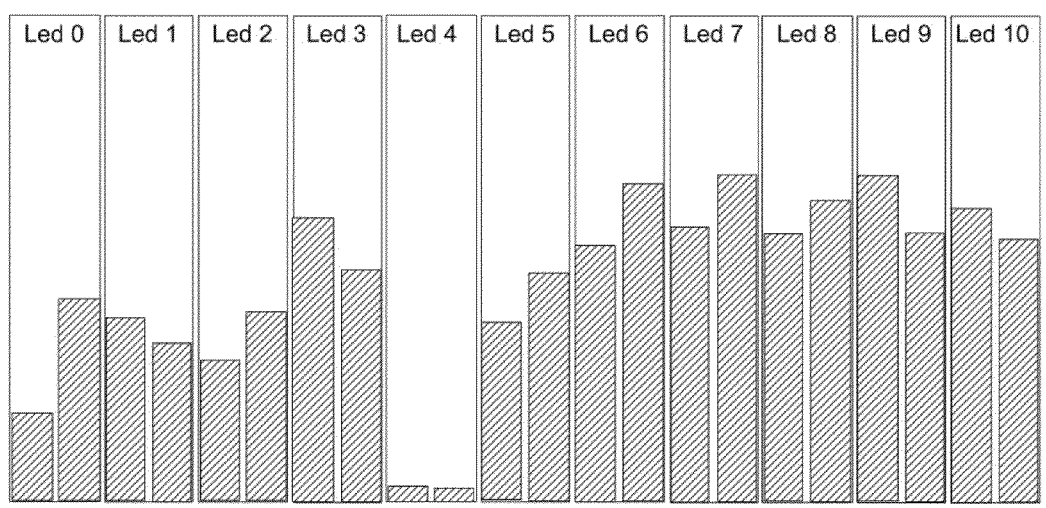
FIGS. 9 and 10 are bar charts showing increase in light detected, when pressure is applied to a rigidly mounted 7-inch LCD screen, in accordance with an embodiment of the present invention.
Figure 10:
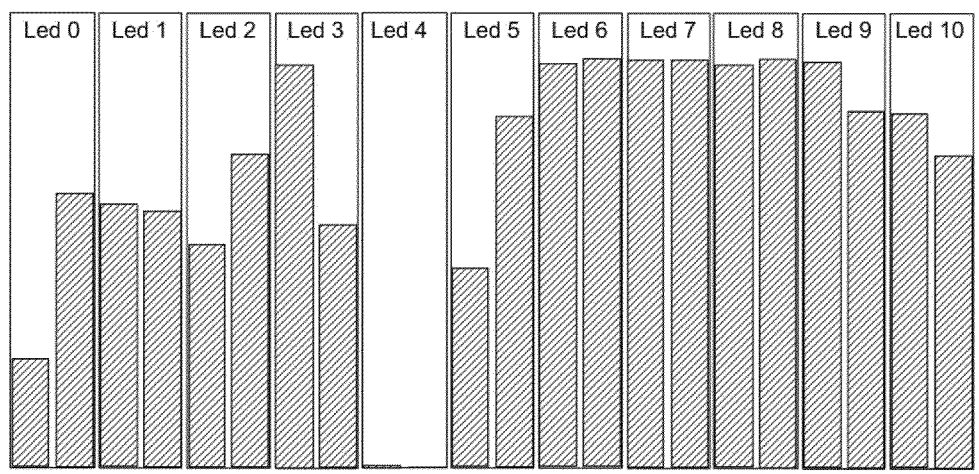

Reference is made to FIGS. 9 and 10, which are bar charts showing increase in light detected, when pressure is applied to a rigidly mounted 7-inch LCD screen, in accordance with an embodiment of the present invention. The bar charts show the amount of light detected from each emitter along one edge of the screen when a soft touch occurs (FIG. 9), and when a hard touch occurs (FIG. 10). The light emitters and light receivers are shift-aligned, so that light from each emitter is detected by two receivers. As such, two bars are shown for each emitter, indicating the light detected by each of the two receivers. Both bars indicate that a touch is detected at receivers opposite LED 4, where no light is detected. The bar charts show that more light is detected from neighboring emitters in the case of a hard touch, than in the case of a soft touch.

The present invention has broad application to electronic devices with touch sensitive screens, including small-size, mid-size and large-size screens. Such devices include inter alia computers, home entertainment systems, car entertainment systems, security systems, PDAs, cell phones, electronic games and toys, digital photo frames, digital musical instruments, e-book readers, TVs and GPS navigators.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A touch screen, comprising:
   a housing;
   a display mounted in said housing;
   a touch sensor, mounted in said housing and connected to said display, for dynamically sensing a current location of an object that is touching said display;
   a pressure sensor, mounted in said housing and connected to said display, for dynamically sensing a current relative pressure being applied by the object to said display,
   wherein said touch sensor and said pressure sensor comprise:
      a shared plurality of light emitters below said display in said housing, for emitting light beams across said display; and
      a shared plurality of light receivers below said display in said housing, for receiving the emitted light beams; and
   a processor, mounted in said housing and connected to said touch and pressure sensors and to said display, for (i) identifying the current location of the object touching said display based on at least two of said light receivers receiving less than an expected amount of light from beams emitted by said light emitters that cross that location, (ii) detecting the object gliding along said display based on a time series of such identified current locations, (iii) detecting an increase of pressure being applied by the object to said display based on increased amounts of light arriving at the remaining light receivers from beams emitted by said light emitters that cross identifiable locations on said display at which the object is not currently located, (iv) enabling a scroll-by-glide user interface whereby the processor performs a scroll operation in response to detecting the object gliding along said display via said touch sensor, (v) enabling a scroll-by-press user interface whereby the processor continues the scroll operation in response to detecting a current relative pressure being applied by the object to said display via said pressure sensor, and (vi) for enabling a transition from the scroll-by-glide interface to the scroll-by-press interface in response to the object gliding over to an edge of said display.

2. The touch screen of claim 1 wherein said display is flexibly mounted in said housing in such a way that the amounts of light received by said light receivers change when said display moves within said housing.

3. The touch screen of claim 1 wherein said display comprises a flexible material that bends resiliently in response to applied pressure in such a way that the amounts of light received by said light receivers change when said flexible material bends.

4. The touch screen of claim 1 wherein said pressure sensor senses multiple levels of relative pressure being applied by the object to said display, and wherein said processor dynamically adjusts the scroll speed of the scroll operation during activation of the scroll-by-press user interface based on the level of relative pressure currently sensed by said pressure sensor.

5. A non-transitory computer readable medium storing instructions which, when executed by a processor of an electronic device that comprises a housing in which is mounted a touch sensitive and pressure sensitive display, a shared plurality of light emitters, below the display in the housing, for emitting light beams across the display, and a shared plurality of light receivers, below the display in the housing, for receiving the emitted light beams, cause the processor (i) to identify a current location of an object touching the display based on at least two of the light receivers receiving less than an expected amount of light from beams emitted by the light emitters that cross that location, (ii) to detect the object gliding along the display based on a time series of such identified current locations, (iii) to detect an increase of pressure being applied by the object to the display based on increased amounts of light arriving at the light receivers from beams emitted from the light emitters that cross identifiable locations on the display at which the object is not currently located, (iv) to enable a scroll-by-glide user interface whereby the processor performs a scroll operation in response to detecting the object gliding along the display, (v) to enable a scroll-by-press user interface whereby the processor performs a scroll operation in response to detecting a current relative pressure being applied by the object to the display, and (vi) to enable a transition from the scroll-by-glide interface to the scroll-by-press interface in response to detecting the object gliding to an edge of the display.

6. The non-transitory computer readable medium of claim 5, wherein the user interface dynamically adjusts the scrolling speed in accordance with the amount of current relative pressure applied to the display during activation of the scroll-by-press user interface.

7. The non-transitory computer readable medium of claim 6, wherein greater relative pressures applied to the display during activation of the scroll-by-press user interface correspond to slower scroll speeds.

8. The touch screen of claim 1, wherein the edge of said display is devoid of graphics representing the scrolling.

* * * * *